UNITED STATES PATENT OFFICE.

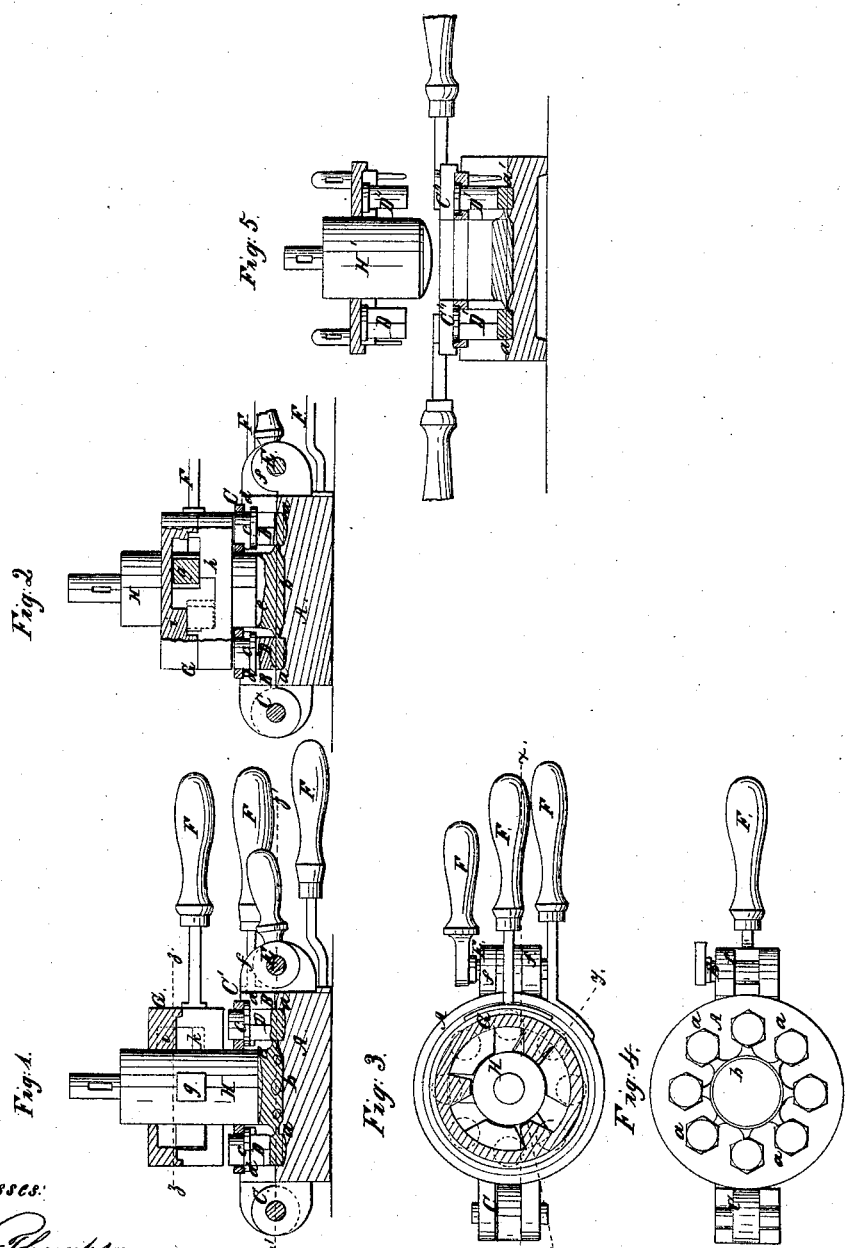

CHAS. H. WARNER, OF BROOKLYN, NEW YORK, ASSIGNOR TO THE BROOKLYN FLINT GLASS CO., OF SAME PLACE.

GLASS-MOLD.

Specification of Letters Patent No. 27,873, dated April 10, 1860.

*To all whom it may concern:*

Be it known that I, CHARLES H. WARNER, of Brooklyn, in the county of Kings and State of New York, have invented a new and useful Improvement in Molding Glass for Vault-Lights and other Purposes; and I do hereby declare that the following is a full, clear, and exact description of the same, reference being had to the annexed drawings, making a part of this specification, in which—

Figure 1, is a vertical section of a mold, constructed with a view of molding glass according to my invention $x$, $x$, Fig. 3, indicating the plane of section; Fig. 2, a longitudinal section of ditto taken in the line $y$, $y$, Fig. 3; Fig. 3 a horizontal section of ditto taken in the line $z$, $z$, Fig. 1; Fig. 4, a horizontal section of ditto taken in the line $z'$, $z'$, Fig. 1; Fig. 5 a vertical central section of a modification of ditto.

Similar letters of reference indicate corresponding parts in the several figures.

The object of this invention is to overcome the difficulty attending the shrinking of the glass in cooling in the molds, said shrinkage hitherto causing the articles cast or molded, to be of imperfect form, and without that sharp angularity so necessary to a chaste and ornamental appearance.

This invention consists in the combination of mechanism substantially as hereinafter described, for subjecting the melted glass while in the mold, to two pressures, one succeeding the other, the latter pressure being given during the cooling of the glass so as to compensate for the shrinking of the same.

To enable those skilled in the art to fully understand and practice my invention I will proceed to describe it.

A represents a cylindrical cast iron block, in the upper surface of which there are portions of a series of polygonal molds $a$, for casting vault lights, said molds all communicating with a recess $b$, at the center of block A, as shown clearly in Figs. 1, 2 and 4. The other portions of the molds $a$, are formed in a cast iron block B, which may be of equal diameter to A, and connected to it by a hinge joint C, the two portions of the molds precisely coinciding where the block B, is turned down on block A, see Figs. 1 and 2, the molds $a$, being formed annularly around the recess $b$, as shown clearly in Fig. 4. Each mold $a$, is provided with a plunger D, and these plungers are fitted in the upper portions of the molds in block B, the plungers being provided each with a shoulder $c$, the shoulders being fitted in recesses $d$, in the upper surface of block B, said recesses being covered by a plate C′, which is secured to the top of the block B. The recesses $d$, are of such a depth as to allow a certain degree of play or vertical movement of the plungers, as will be fully understood by referring to Fig. 1.

The plungers D, extend entirely through the plate C′, and there is a circular opening $e$, at the center of plate C, and the block B, which opening corresponds in diameter with the recess $b$, at the center of the block A, as shown clearly in Figs. 1 and 2.

E is a bolt which extends through eyes $f$, attached to the two blocks A, B, and serves as a block or fastening for the same. Each block is provided with a handle F.

G is an annular cast-iron box through the center of which a plunger H, passes which plunger is allowed to slide freely up and down, the plunger H, corresponds in diameter to the opening $e$, in the plate C, and block B, and to the recess $b$, in the block A. The plunger H, has projections $g$, attached to its side, and within the box G, there are placed and permanently secured ledges or projections $h$, said ledges or projections being attached to the bottom of box G, see Figs. 1, 2 and 3, the box G, has also within it, attached to its upper part, ledges or projections $i$, corresponding in number to the ledges or projections $h$, but the former are not equal in length to the latter and consequently an open or uninterrupted space is allowed between the projections, and these spaces about correspond in width, to the width of the projections $g$, of plunger H, the box G, has also a handle F, attached.

The operation of the machine is as follows. The box G, and plunger H, are connected to a press of any suitable kind, and when the box G, and plunger H, are elevated, a necessary portion of hot glass is dropped into the recess $b$, and the plunger H, by the action of the press is forced down, the box G, being stationary, and the glass is pressed into the several molds $a$, and the plungers D, raised under the action of the glass subjected to the pressure of the plunger H. The upward movement of the plungers D, is determined by the shoulders $c$, in the recesses *d*, and when the descent of the plunger D, is completed, it is made to ascend, and the operator turns the box G, so as to bring the projections *h*, at the bottom of the box G, under the projections *g*, of the plunger H, as shown in Fig. 2. By this arrangement the box G, is secured to the plunger H, near its lower end, and the plunger H, again descends carrying the box G with it, and causing the box to force down the plunger D, the plunger H, not acting on the glass in the recess *b*, in consequence of the box being near the lower end of the plunger. The plungers D, as they are depressed compress the glass in the molds *a*, subjecting it to a second pressure, and during the process of cooling, thereby causing the glass to be molded perfectly in sharp angular form corresponding precisely to the form of the molds.

I do not confine myself to the precise means above described for subjecting the glass to two consecutive pressures for modifications of the same may be employed, for instance in Fig. 5, plungers D', are shown attached to a plate C'', and a central plunger H', shown, attached to a plate G', having plugs D'', secured to it, the two plates C'', and G', being used consecutively in order to subject the glass in the molds *a'*, to the two pressures, the plugs D'', checking the ascent of the glass in the molds under the pressure of plunger H', the latter being entirely removed when the plungers D', are forced down into the molds. This plan of molding it will be seen is substantially the same as the one previously described, but the one first described is preferable, as the plungers may be adjusted with greater facility than the last described plan, this facility with which the plungers may be operated is important, for glass having such a little affinity for heat it quickly cools and unless the second pressure soon succeeds the first the operation is useless.

Having thus described my invention what I claim as new and desire to secure by Letters Patent, is,

1. The mechanism for molding glass for vault lights and other purposes by which it is subjected to two consecutive pressures, one being applied for forcing or injecting, and pressing the melted glass properly into the mold or molds, and the other being applied during the cooling operation of the glass in the molds, substantially as and for the purpose set forth.

2. I also claim the employment or use of a forcing or induction plunger H, or H', in connection with pressure plungers D, D', and molds *a*, *a'*, arranged to operate substantially as and for the purpose specified.

CHAS. H. WARNER.

Witnesses:
WM. THOMPSON,
M. M. LIVINGSTON.